United States Patent [19]
Shapiro

[11] Patent Number: 5,091,930
[45] Date of Patent: Feb. 25, 1992

[54] ENHANCEMENT OF A PERSONAL EMERGENCY RESPONSE SYSTEM

[75] Inventor: L. Dennis Shapiro, Chestnut Hill, Mass.

[73] Assignee: Lifeline Systems, Inc., Watertown, Mass.

[21] Appl. No.: 622,361

[22] Filed: Dec. 4, 1990

Related U.S. Application Data

[63] Continuation of Ser. No. 308,551, Feb. 8, 1989, abandoned.

[51] Int. Cl.[5] .............................................. H04M 11/04
[52] U.S. Cl. ........................................ 379/39; 379/38; 379/48
[58] Field of Search ...................... 379/38, 39, 40, 48, 379/49; 340/539, 902, 904; 455/57

[56] References Cited

U.S. PATENT DOCUMENTS 4,064,368  12/1977  Dibner ................................ 379/38
4,518,822   5/1985  Martinez ......................... 379/48 X
4,536,750   8/1985  Ebihara ........................... 340/539

FOREIGN PATENT DOCUMENTS 295146  12/1988  European Pat. Off. ............. 379/39

Primary Examiner—James L. Dwyer
Assistant Examiner—Stella L. Woo
Attorney, Agent, or Firm—Weingarten, Schurgin, Gagnebin & Hayes

[57] ABSTRACT

An apparatus and method for use in combination with a personal emergency response system. Typical systems establish a telephone communication link between a subscriber station and a central monitoring station in order to monitor the needs of elderly and/or infirm persons confined to their residences. In the normal operation of a system, a user located at a subscriber station activates a subscriber unit which transmits an alert signal via a telephone communication link to a central monitoring station which dispatches aid to the subscriber station. The system of the present invention incorporates an ancillary radio frequency receiver or transceiver subsystem as an alternate communication link in the event that telephone service becomes disabled. The ancillary radio receiver provides the user with the ability to receive radio frequency transmissions which inform the user that telephone lines have become disabled. In a second embodiment, a supplemental radio transceiver subsystem is implemented into the system to provide the user with the capability to transmit as well as receive information in the event that normal telephone channels are incapacitated.

14 Claims, 1 Drawing Sheet

ENHANCEMENT OF A PERSONAL EMERGENCY RESPONSE SYSTEM

This application is a continuation of application Ser. No. 07/308,551, filed Feb. 8, 1989 now abandoned.

FIELD OF THE INVENTION

This invention relates generally to personal emergency response systems and, more specifically, to a method and apparatus for incorporating a radio frequency receiver or transceiver into such systems.

BACKGROUND OF THE INVENTION

U.S. Pat. No. 4,064,368 of the same assignee discloses a personal emergency response system for monitoring the needs of elderly or infirm persons confined to their residences. A typical system employs a subscriber unit located at a user site which, when activated, transmits an alert signal via a telephonic communication link to a central monitoring station. At the central monitoring station, directions are issued to dispatch aid to the residence from which the alert signal was received. Systems of this type have proven to be an effective tool for monitoring the condition and responding to the needs of elderly and/or infirm persons confined to their residences.

The system described above utilizes common telephone lines to communicate between a subscriber station and a central monitoring station. In the event of a natural disaster (e.g., floods, hurricanes, etc.), where telephone services may become disabled, the personal emergency response system will be rendered useless if it is unable to communicate with the central monitoring station. Thus, it is desirable to implement an alternative communications system into a personal emergency response system which allows the system user to receive or transmit information over a telephone-line independent, wireless channel, such as a radio frequency communication system.

SUMMARY OF THE INVENTION

The present invention discloses a personal emergency response system wherein the subscriber station of such system is augmented with a receiver or transceiver for radio frequency communication between a subscriber station and an ancillary emergency communication station employed in the network of the system. Typical personal emergency response systems include transmission means associated with a subscriber station for transmitting an alert signal over a standard telephone communication link to a central monitoring station.

The present invention incorporates additional communications means at the subscriber station for receiving or receiving and transmitting radio frequency signals. A radio frequency transmission is generated at a remote emergency communication station incorporated into the system wherein the emergency communication station can take the form of a pre-existing radio transmitter such as with the Emergency Broadcast System or a transceiver specifically implemented into the network of a personal emergency response system which could be located in a vehicle or an aircraft or be carried on foot.

In accordance with the present invention, a subscriber unit located at the subscriber station is provided with a receiver or transceiver which permits communication between the subscriber station and the emergency communication station. In one embodiment of the system according to the present invention, the subscriber unit is augmented with a receiver which monitors a particular frequency or frequencies or scans multiple-fixed frequencies in search of radio activity or a particular enabling code. When activity or an enabling code is detected, the subscriber unit is activated to broadcast the signal received from the emergency communication station over a local loudspeaker at the subscriber station.

In a second embodiment of the present invention, the adjunct receiver of the subscriber unit is an active receiver module which receives entertainment or news over normal radio transmission channels and simultaneously monitors and scans a predetermined frequency or frequencies for radio activity or a particular enabling code. Upon detection of activity or an enabling code, the receiver of this embodiment automatically switches to the proper frequency to receive and broadcast the emergency transmission signal.

In yet another embodiment of the invention, the subscriber unit is augmented with the addition of a radio frequency transceiver wherein the transceiver can both receive and transmit radio frequency signals. The transmitter section of this embodiment is used to transmit a beacon signal or a voice signal such that two-way voice communication with the emergency communication station can be achieved.

DESCRIPTION OF THE DRAWINGS

A more complete understanding of the present invention, as well as other features and advantages of the invention, will be apparent from the following detailed description of the invention in conjunction with the accompanying drawings wherein.

DETAILED DESCRIPTION OF THE INVENTION

Figure 1:
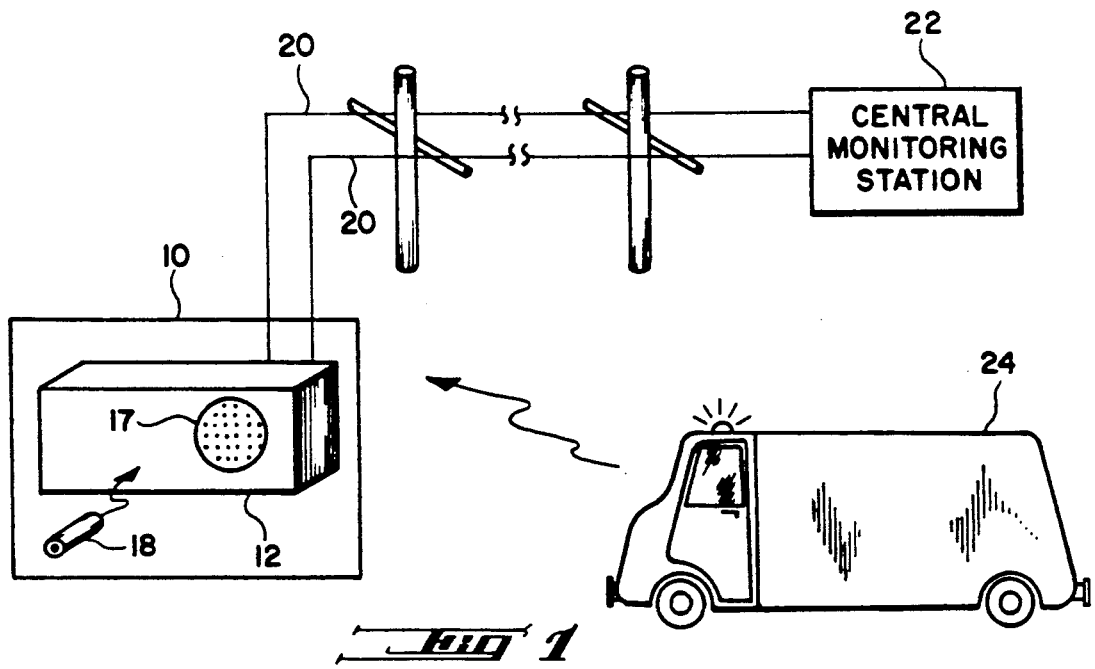
FIG. 1 is a diagrammatic view of a personal emergency response system according to the present invention.

A personal emergency response system in accordance with the present invention is shown in FIG. 1 which shows an overview of a system exemplifying a typical personal emergency response system including a subscriber station 10, a central monitoring station 22, and a communications link 20. The exemplary communication link 20 utilized in this system is a telephone line which interfaces the subscriber station 10 to the central monitoring station 22.

Normal operation of the personal emergency response system is initiated by a user located at the subscriber station 10, wherein the user triggers a subscriber unit 12, as for example, by means of a manual activation switch 18. The subscriber unit 12 transmits an alert signal which typically includes identification data pertinent to the remote subscriber station 10, as well as the alert message, to the central monitoring station 22 over the communication link 20. This initiation process also activates a signaling device at the subscriber unit 12 which informs the user that the alert signal has been transmitted.

The present invention discloses a subsystem for use in a personal emergency response system, including an enhanced subscriber unit 12, augmented with a radio receiver, and an emergency communication station 24 provided with a radio frequency transmitter implemented into the network of a personal emergency response system as described above. This subsystem provides the capability to convey informational messages over a predetermined frequency or frequencies in order to notify subscribers that an emergency situation exists. It should be understood that the system may contain other subsystems typically found in such personal emergency response systems, for example, a timing logic circuit for automatically activating the subscriber unit when no activity has been detected at the subscriber station over a predetermined period of time.

Figure 2A:
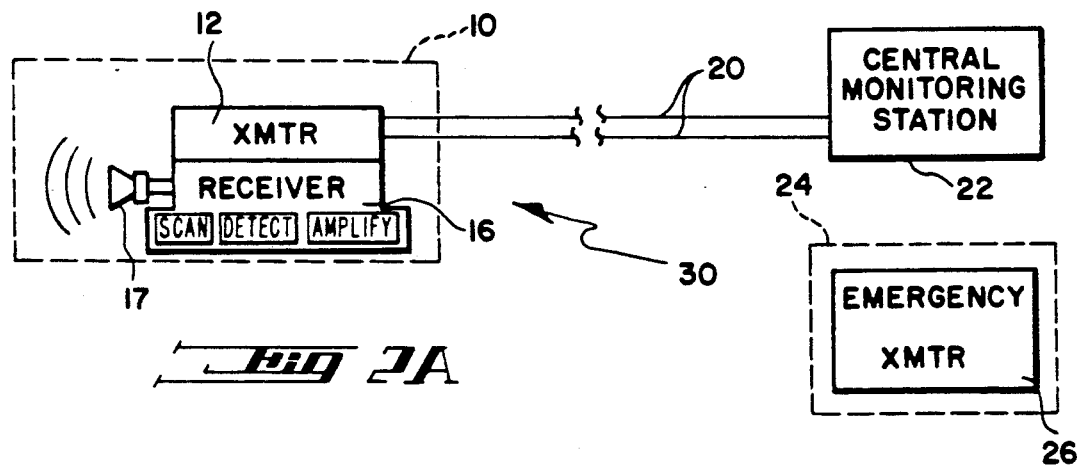
FIG. 2A is a block diagram of one embodiment of a subscriber unit according to the present invention.

A block diagram of this enhanced personal emergency response system is depicted in FIG. 2A, wherein the system is augmented with a radio frequency receiver 16 located at the subscriber station and a corresponding radio frequency transmitter 26 located at the emergency communication station 24. The receiver module 16 is operative to receive an information signal 30 as transmitted from the emergency communication station 24 by monitoring a particular frequency or frequencies. Alternatively, the receiver 16 is activated by an enabling code included in the information signal 30 transmitted by the transmitter 26. Upon detection of a signal by the receiver 16, the subscriber unit 12 switches into a mode to amplify and broadcast the information signal 30 over a loudspeaker 17, at the subscriber station 10.

In one embodiment of the invention, the receiver module 16 is normally inactive. In this embodiment, the receiver 16 remains tuned to the particular frequency or frequencies over which the transmitter 26 at the emergency communication station 24 transmits. When the receiver 16 detects activity or an enabling code from the information signal 30 transmitted from the emergency communication station 24, the subscriber unit 12 switches to an active state in order to receive the information signal and broadcast it over the subscriber station loudspeaker 17.

In another embodiment, the receiver is operated in a manner similar to a conventional radio. In this embodiment, the receiver 16 is normally active to receive entertainment or news as provided by common radio stations. The receiver 16 also monitors a particular frequency or frequencies over which the emergency communication station 24 transmits in order to detect activity or an enabling code. Upon detection of such activity or enabling code, the subscriber unit 12 automatically switches to the emergency frequency to allow for reception and broadcast of the information signal at the subscriber station 10.

Figure 2B:
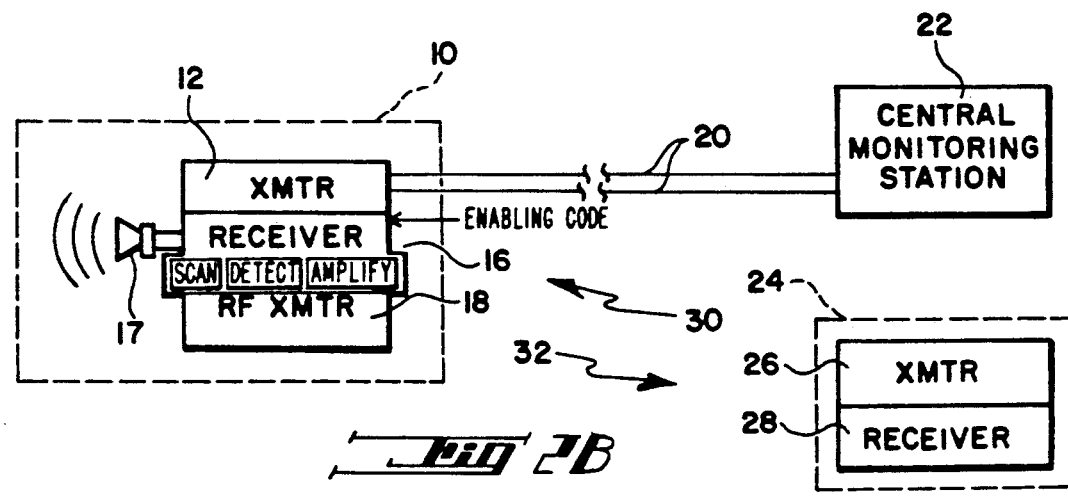
FIG. 2B, is a block diagram of a second embodiment of a subscriber unit according to the present invention.

In yet another alternative embodiment, as shown in FIG. 2B, the subscriber unit 12 includes a radio transmitter 18 in addition to the receiver 16. This transmitter 18 operates to transmit a signal 32 to a corresponding receiver 28 located at the emergency communication station 24. The signal 32 transmitted by this transmitter 18 is in the form of a beacon signal, informing the emergency communication station 24 that a subscriber requires assistance, or a voice link, allowing for two-way voice communication between the subscriber station 10 and the emergency communication station 24.

A variety of modifications and variations of the present invention are possible in light of the above teachings. Therefore, it is to be understood that the invention is to be viewed as embracing each and every novel feature and novel combination of features present in or possessed by the apparatus herein disclosed, to be limited solely by the scope and spirit of the appended claims.

What is claimed is:

1. A personal emergency response system which includes at least one subscriber station coupled via a telephonic communication link to a central monitoring station, comprising:
    dedicated emergency communication means for radio frequency transmission of information signals over at least one predetermined frequency;
    subscriber unit means disposed within the at least one subscriber station and normally operative in response to a predetermined condition for transmitting messages over the telephonic communication link to the central monitoring station:
    emergency transceiver means having a receiver and a transmitter and normally operative as a radio receiver but not as a transmitter;
    means coupled to the emergency transceiver means for monitoring the at least one predetermined frequency for information signals transmitted thereon and operative in response for reception of the information signals for broadcasting the information signals within the at least one subscriber station via the radio receiver and for transmitting a signal back to the dedicated emergency communications means via the transmitter.

2. The personal emergency response system of claim 1, wherein
    said emergency transceiver means further includes means for receiving radio signals on a predetermined frequency; and
    said subscriber station further includes transceiver means for transmitting and receiving information signals.

3. The personal emergency response system of claim 1, wherein said emergency transceiver means further includes:
    scan means coupled to said receiver means for scanning the at least one predetermined frequency for radio activity;
    detection means coupled to said scan means for detecting information signals on the at least one predetermined frequency;
    amplifier means coupled to said detection means for amplifying the detected information signals; and
    loudspeaker means coupled to said amplifier means for producing an audio signal corresponding to the detected information signals.

4. The personal emergency response system of claim 1, wherein the information signals transmitted by said emergency transceiver means include an enabling code.

5. The personal emergency response system of claim 4, wherein said subscriber unit means further includes;
    scan means coupled to said receiver means for scanning the at least one predetermined frequency; and
    detection means coupled to said scan means for detecting an enabling code on the at least one predetermined frequency.

6. The personal emergency response system of claim 1, wherein said emergency transceiver means is a mobile unit.

7. The personal emergency response system of claim 1, wherein said emergency transceiver means is operative to transmit a beacon signal over the at least one predetermined frequency.

8. The personal emergency response system of claim 1, wherein:
 said emergency transceiver means is operative to transmit and receive voice signals over at least one predetermined frequency; and
 said emergency transceiver means is operative to transmit and receive voice signals over at least one predetermined frequency; wherein
 said emergency transceiver means and said communication means are operative in combination to establish a two-way voice communication link.

9. An apparatus for providing radio frequency communication in a personal emergency response system, said personal emergency response system including at least one subscriber station coupled via a telephonic communication link to a central monitoring station, wherein said apparatus for providing radio frequency communication comprises:
 a dedicated emergency communication station capable of transmitting a warning signal over at least one predetermined first radio frequency and capable of transmitting emergency information over a predetermined second radio frequency;
 subscriber unit means disposed within the at least one subscriber station and normally operative in response to a predetermined condition for transmitting messages over the telephonic communication link to the central monitoring station;
 emergency radio means having a speaker and normally in an off state; and
 means coupled tot he emergency radio means for monitoring said at least one predetermined first radio frequency for said warning signal and operative in response to reception of the warning signal for causing the emergency radio means to assume an on state and to receive emergency information on said predetermined second radio frequency and for broadcasting in the on state the emergency information signals within the at least one subscriber station via the speaker of the emergency radio means.

10. The apparatus of claim 9, wherein the emergency radio means further comprises receiver means for receiving information signals transmitted on the at least one predetermined second radio frequency.

11. The apparatus of claim 9, wherein said emergency radio means further comprises:
 receiver means for receiving information signals transmitted on the at least one predetermined second radio frequency; and
 transmitter means for transmitting a radio signal on at least one predetermined third radio frequency.

12. The apparatus of claim 9, wherein said emergency radio means includes:
 scan means for scanning the at least one said predetermined first radio frequency for radio activity;
 detection means coupled to said scan means for detecting information signals on the at least one said predetermined second radio frequency;
 amplifier means coupled to said detection means for amplifying the detected information signals; and
 loudspeaker means coupled to said amplifier means for producing an audio signal corresponding to the detected information signals.

13. The apparatus of claim 11 in which said predetermined third radio frequency is equal to said predetermined second radio frequency.

14. The apparatus of claim 11 in which said predetermined third radio frequency is equal to said predetermined first radio frequency.

* * * * *